United States Patent [19]
Döbbeler

[11] Patent Number: 5,195,858
[45] Date of Patent: Mar. 23, 1993

[54] FASTENER APPARATUS FOR LOCKING TOGETHER TWO COMPONENTS

[75] Inventor: Peter Döbbeler, Kirchhundem, Fed. Rep. of Germany

[73] Assignee: Camloc GmbH, Kelkheim, Fed. Rep. of Germany

[21] Appl. No.: 775,522

[22] Filed: Oct. 15, 1991

[30] Foreign Application Priority Data

Oct. 13, 1990 [DE] Fed. Rep. of Germany ....... 4032594

[51] Int. Cl.$^5$ .......................... F16B 21/18; F16B 39/00
[52] U.S. Cl. ..................... 411/353; 411/105; 411/107; 411/999
[58] Field of Search .............. 411/105, 352, 353, 517, 411/518, 519, 521, 530, 918, 999; 403/326, 327, 328, 155

[56] References Cited

U.S. PATENT DOCUMENTS

| | | | |
|---|---|---|---|
| 4,125,140 | 11/1978 | Basile | 411/105 |
| 4,174,008 | 11/1979 | Preziosi et al. | |
| 4,735,536 | 4/1988 | Duran | 411/517 |
| 4,802,700 | 2/1989 | Stevenson et al. | 411/353 |
| 5,073,071 | 12/1991 | Herwig et al. | 411/353 |
| 5,076,747 | 12/1991 | Cosenza | 411/353 |

FOREIGN PATENT DOCUMENTS

1555035 11/1979 United Kingdom .
2213896 8/1989 United Kingdom .
2213897 8/1989 United Kingdom .

Primary Examiner—Neill R. Wilson
Attorney, Agent, or Firm—Wenderoth, Lind & Ponack

[57] ABSTRACT

A fastener for joining together two components includes a closure pin permanently securable to a first component and a receptacle disposed on the far side of a second component. The closure pin has a head section adapted for support in an outer side of the first component and a shank section extending through a hole in the first component and a hole in the second component aligned with the hole in the first component and having a thread mating with an internal thread in a fastening section of the receptacle. The peripheral surface of the closure pin has a radial taper zone with a stop face radially extended on the opposite side from the head section and formed by a rim stop. The stop face engages with a safety element to prevent complete extraction of the closure pin from the hole in the first component. The safety element is disposed in a groove open to the hole in the first component. Removal of the pin is made possible by making the outer diameter of the rim stop sufficiently smaller than the outer diameter of the rim stop sufficiently smaller than the outer diameter of the shank section outside the taper zone to allow insertion therebetween of a hollow cylindrical section of a releasing tool that fits around and over the rim stop and the taper zone until the latter is covered. The outer diameter of the releasing tool is equal to or smaller than the outer diameter of the shank section outside the taper zone.

15 Claims, 6 Drawing Sheets

FASTENER APPARATUS FOR LOCKING TOGETHER TWO COMPONENTS

BACKGROUND OF THE INVENTION

The invention relates to a fastener for joining together two components, for example two at least locally flat components. The fastening includes a closure pin lockingly securable to a first component and a receptacle disposed on the far side of a second component. The closure pin has a head section adapted for support an outer side of the first component and a shank section extending through a hole in the first component or a guide sleeve disposed in the hole in the first component and through a hole in the second component aligned with the hole in the first component or the guide sleeve. The shank section has a thread mating with an internal thread in a fastening section of the receptacle. A peripheral surface of the closure pin has a radial taper with a stop face radially extended on the opposite side from the head section and formed by a rim stop. The stop face engages with a safety element to prevent complete extraction of the closure pin from the hole in the first component or the guide sleeve. The safety element is inserted, preferably under radially inward pre-stress, in the hole in the first component or the guide sleeve and disposed in a groove open to the hole in the first component or the guide sleeve.

A fastener of this type is known. In such known fastener, the closure pin is held in the first component by a radially inwardly pre-stressed safety ring of rectangular or square cross-section, which is disposed in an annular groove formed in a guide sleeve fitting in the first component and engages with a radial taper on the shank section of the closure pin. On extracting movement of the closure pin from the hole in the first component or the guide sleeve, the safety ring initially slides along a cylindrical zone of the shank section, until it encounters the zone of the radial taper, onto which it contracts by reason of its pre-stress. Complete withdrawal of the closure pin from the hole in the first component is prevented by the widened stop face, which is engaged by the safety ring lying tightly round the tapered zone of the closure pin. Thus, the closure pin can be withdrawn until the safety ring encounters the above-mentioned stop face, but is then permanently held within the hole in the first component. The known fastener is defective in that the closure pin can never be removed from the first component without being more or less destroyed. To effect removal, one must take off, for example saw off, either the head section or the rim stop on the other end of the closure pin, which on the one hand costs time and money and on the other hand renders the closure pin unfit for further use.

SUMMARY OF THE INVENTION

The object of the present invention is to devise a fastener of the type initially described, which facilitates both a locked securing of the closure pin to the first component and also its easy and damage-free removal therefrom.

According to the invention, this object is achieved in that the outer diameter of the rim stop is sufficiently smaller than the outer diameter of the shank section outside the taper zone thereof for it to be possible to insert a hollow cylindrical section of a releasing tool ground and over the rim stop and the taper zone until the latter is covered, the outer diameter of the releasing tool being equal to or smaller than the outer diameter of the shank section outside the taper zone.

With these provisions, the closure pin, while still fixedly securable to the first component, can now if required be rapidly and reliably released from its locked position on the first component. Thus, after sliding the hollow cylindrical section of the releasing tool over the free end of the closure pin, such section prevents the safety element from contracting into the taper zone on the shank section of the closure pin when the closure pin carrying the bridging section of the releasing tool is urged through the hole in the first component or the guide sleeve. On the contrary, the end zone of the closure pin with the taper and the rim stop, bridged by the hollow cylindrical section of the releasing tool, is guided past the safety element, which slides along the outer surface of the hollow cylindrical section, which is completely smooth, without being able to engage in the taper zone.

In further development of the concept of the invention, the wall of the groove nearer the head section of the closure pin can feature a second, preferably annular, groove of smaller depth. When the closure pin is urged out of the hole in the first component or the guide sleeve and the possibility thereby exists that the safety element will tend to bulge radially inwards and engage the stop face at the end zone of the pin, provision is now made for the safety element to move axially relative to the guide sleeve and enter the shallower second groove, taking up a position such that even extreme force can no longer make the safety element bulge radially outwards, which might be the case if the safety element remained as before in the deeper first annular groove.

The basic object of the invention is particularly reliably achieved when the sum of the smallest outer diameter of the taper zone plus twice the thickness of the safety element exceeds the inner diameter of the hole in the first component or the guide sleeve, but is slightly smaller than or equal to the outer diameter of the second groove. In this case, the sum of the (maximal) depth of the taper zone and that of the second groove substantially equals the thickness of the safety element. In this way, the secure fixed retention of the closure pin in the first component is combined with the possibility of release with the aid of the releasing tool. In further development of the concept of the invention, a shoulder stop can be provided at the transition from the main groove to the second groove, to ensure that the safety element will remain in the main annular groove when the closure pin is pressed out of the hole in the first component, until the taper zone of the shank section reaches the location of the safety element and the latter can gradually move into its deepest setting on the radial taper zone.

In one simple embodiment of the invention, the taper zone in the shank section of the closure pin can be a known annular groove.

In this connection, the radial taper zone in a further embodiment of the invention can, as is also intrinsically known, have a tapered zone expanding towards the head section, on which the safety element slides when the closure pin is pressed through the hole in the first component or the guide sleeve, from the first taper zone to the cylindrical zone of the shank section, which adjoins the aforementioned taper zone.

Again, the main groove and the second groove in the hole in the first component or the guide sleeve can also be a circumferential annular groove.

This is particularly appropriate when the safety element takes the form of a round-section circular clip, which ensures easy assembly of the closure pin in the first component.

It is within the scope of the invention, and is intrinsically known, to provide a radially widened head region on the end of the optionally provided guide sleeve facing the head section of the closure pin and a radially widenable fixing section on the end furthest from the head section of the closure pin. By these means the guide sleeve can be securely and permanently set in the first component, the fixing section only being widened out by deformation after the guide sleeve has been inserted in the hole in the first component.

It is particularly useful for the easy removal of the closure pin when, in accordance with a further embodiment of the invention, the internal thread in the closure pin can be engaged by a guide thread disposed in the hollow cylindrical section of the releasing tool. In this way, it can be ensured that the hollow cylindrical section of the releasing tool invariably fits satisfactorily on the shank section of the closure pin.

This fit can be ensured even more reliably if the inner wall surface of the hollow cylindrical section of the releasing tool in its releasing position rests on the taper of the taper zone of the closure pin in a substantially locking manner. In this way the cylindrical section of the releasing tool, which should have a relatively small wall thickness and a sharp leading edge, is reliably supported from the inside to take up the safety element, and a smooth transition is ensured from the cylindrical section of the closure pin to the hollow cylindrical section of the releasing tool.

The invention further relates to a releasing tool having a guide thread and/or a hollow cylindrical section of the form hereinbefore described.

Further objects, features, advantages and possible applications of the invention will emerge from the following description of typical embodiments illustrated by the accompanying drawing. All the features described and/or illustrated form parts of the present invention, individually or in any rational combination.

BRIEF DESCRIPTION OF THE DRAWINGS

In the drawings:

FIG. 3b is a detailed view, on a larger scale, of area Z in FIG. 3a;

FIG. 4b is a plan view of the closure pin of FIG. 4a;

FIGS. 5a and 5b are schematic views showing pin can assume relative to the guide sleeve, that shown in FIG. 5a being a position in which the closure pin has been partially withdrawn from the guide sleeve and lies with a cylindrical zone thereof within the guide sleeve, a safety element lying on the cylindrical zone of the closure pin, while FIG. 5b shows a position in which the closure pin has been withdrawn further from the guide sleeve but is still permanently held in the guide sleeve;

DETAILED DESCRIPTION OF THE INVENTION

Figure 1A:
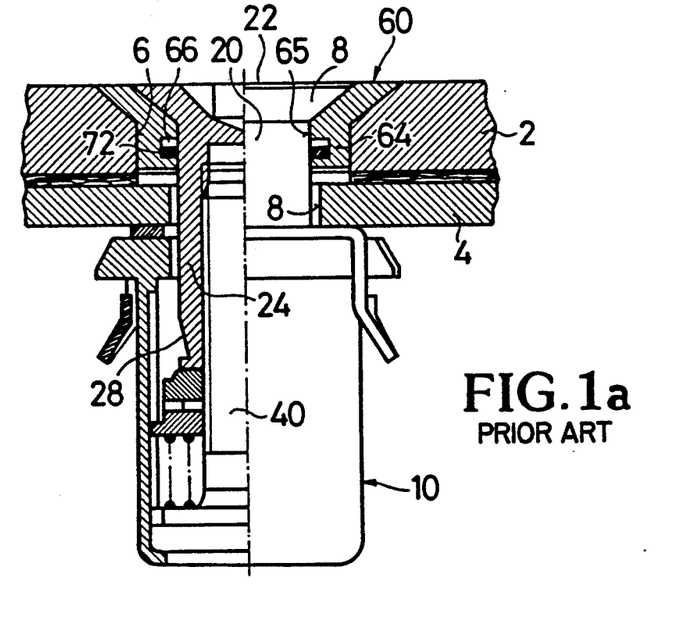
FIG. 1a is a schematic view, partly in section, of a known fastener, shown in the closed state, before improvement in the manner of the invention.
Figure 1B:
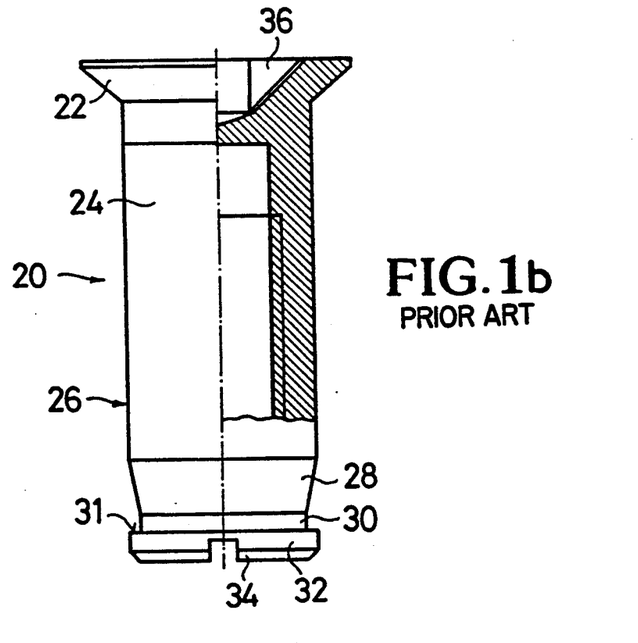
FIG. 1b is a side elevation, partly in section, of a closure pin for the known fastener shown in FIG. 1b.

In the fastener shown in FIG. 1a, two flat components 2 and 4 are joined together by inserting a shank section 24 of a closure pin 20 having an internal thread into a hole 65 inside a guide sleeve 60 disposed in a hole 6 in the first component 2, initially until a rim stop 32 having a chamfer 34 encounters a safety element 72 fitting inside a groove 66 in the hole 65 in the guide sleeve 60 and formed as a tension ring of square or rectangular cross-section. On urging the shank section 24 further into the guide sleeve 60, the safety element 72 is expanded against its inwardly directed spring prestress and thereby urged outwardly and deeper into the groove 66 to allow the passage of first the rim stop 32, then a cylindrical contact zone 30, then a tapered zone 28 and finally a cylindrical zone 26 of the shank section 24 of the closure pin 20, by sliding across the inner face of the safety element 72. On withdrawing the shank section 24 of the closure pin 20 from the guide sleeve 60, the stop face 31 of the rim stop 32 encounters the safety element 72 protruding from the groove 66. In this way, the closure pin 20 is permanently or fixedly secured to the first component 2. After first fitting into the first component 2, the shank section 24 of the closure pin 20 then is inserted through a hole 8 in the second component 4, and a threaded fastening section 40 of a receptacle member 10 is threaded into the internal threads of pin 20 until a conical head section 22 having a screwdriver slot 36 of pin 20 is firmly embedded in a corresponding recess in the guide sleeve 60.

A closure pin 80 of the invention, as shown in FIGS. 2 to 6b, also has a countersunk head section 82 having a screwdriver slot 96, leading to a shank section 84 having an internal thread 89. Directly adjoining the head section 82, the shank section 84 has a cylindrical zone 86, which at the free end of the closure pin 80 is continued by a slightly convergent tapered zone 88 followed by another cylindrical contact zone 90. The tapered zone 88 and the contact zone 90 form a radial taper relative to the rest of the shank section 84. At the tip of the shank, the contact zone 90 terminates at a stop face 91 formed by a rim stop 92. In contrast to the prior art arrangement, the rim stop 92 is slightly smaller in diameter than the cylindrical zone 86 of the shank section 84, and is provided with a terminal outer chamfer 94.

Figure 2:
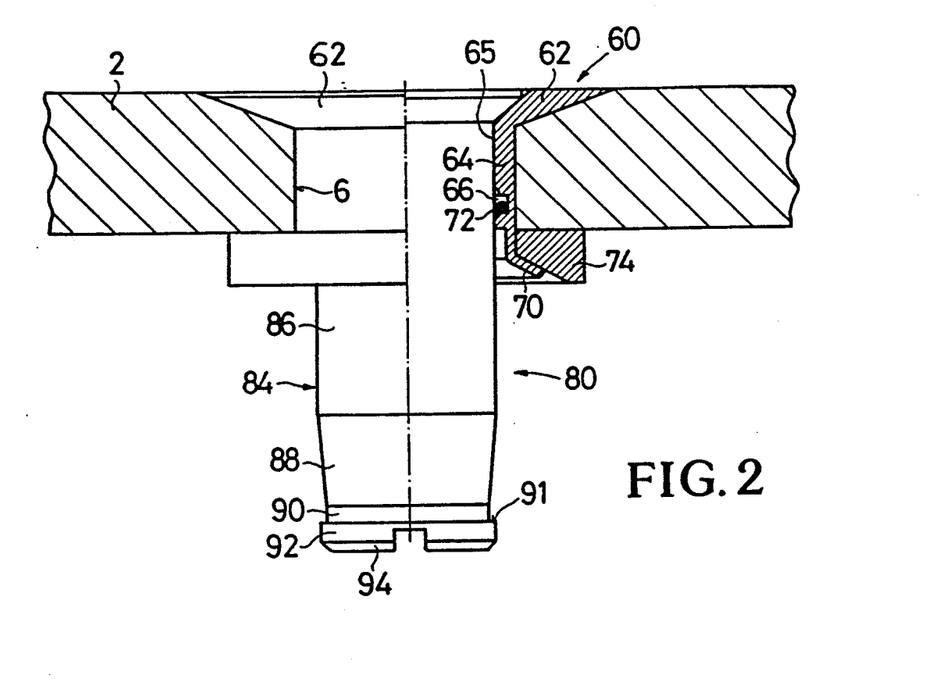
FIG. 2 is a side elevation, partly in section, of a fastener of the invention, a closure pin thereof fitting in a guide sleeve secured in a first component.

In the embodiment shown in FIG. 2, the hole 6 in the first component 2, into which the shank section 84 of the closure pin 80 is inserted, is lined with a guide sleeve 60 having a countersunk head region 62 and a substantially hollow cylindrical shank region 64 defined by a hole 65 and leading to a deformable fixing section 70, which in the case illustrated is deformed outwardly around an interposed washer 74 after the guide sleeve 60 has been inserted into hole 6 and its head region 62 lies in the countersunk recess round the hole 6 in the first component 2. In this way the guide sleeve 60, made from metal for example, is permanently secured in the hole 6 in the first component 2 and provides a secure mount for the insertable closure pin 80.

Figure 3A:
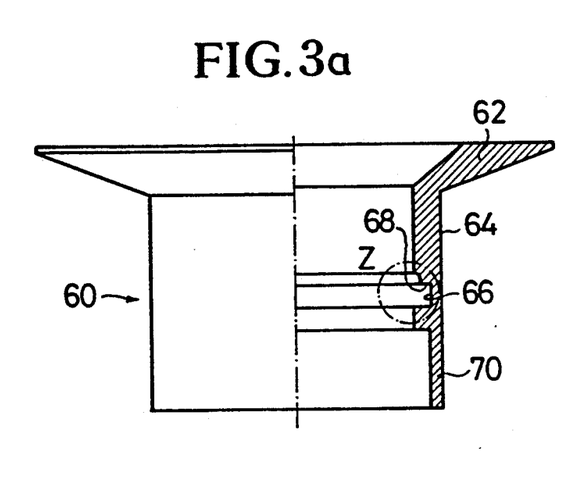
FIG. 3a is a side elevation, partly in section, of the guide sleeve in a fastener as shown in FIG. 2, shown on a larger scale than in the latter and without a safety element.
Figure 3B:
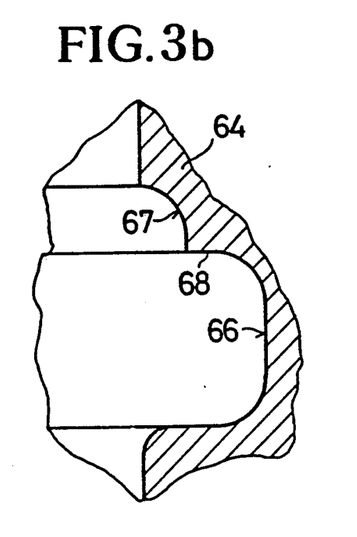
Figure 4A:
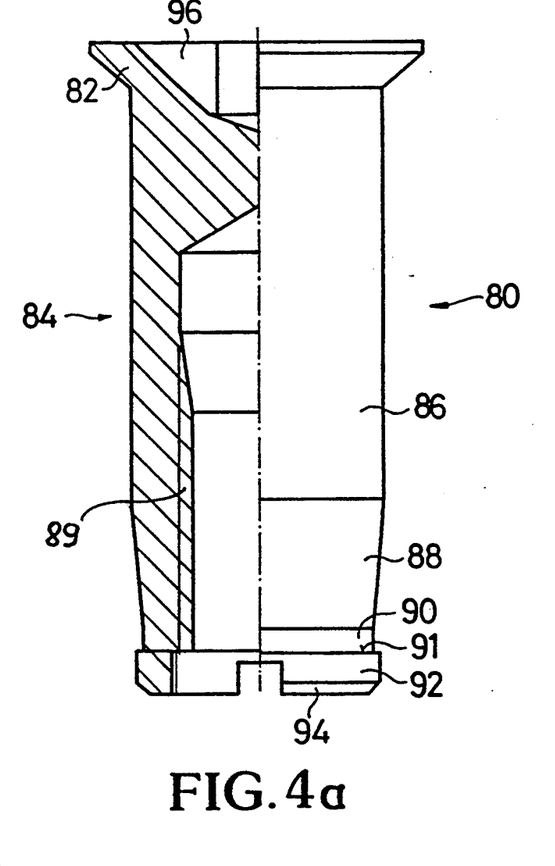
FIG. 4a is a side elevation, partly in section, of a closure pin for the fastener of the invention shown in FIG. 2.
Figure 4B:
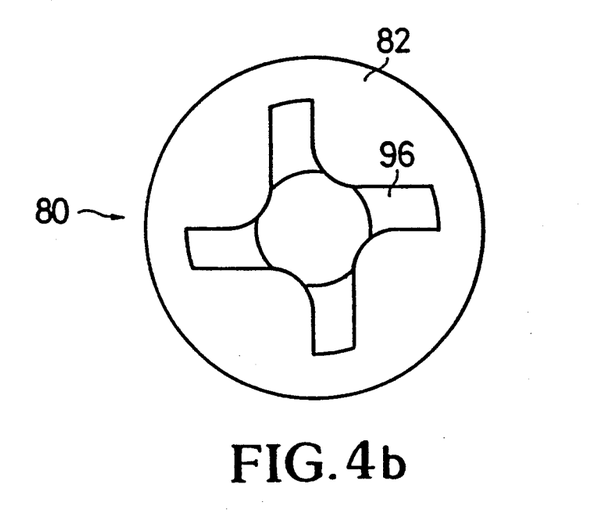

As shown more particularly in FIGS. 3a and 3b, the shank region 64 of the guide sleeve 60 has an internally open circumferential annular groove 66 facing the hole 65. Alongside the groove 66 there is a second groove 67 of smaller depth than the groove 66, also open to and facing the hole 65 and forming an intermediate radial shoulder stop 68.

Figure 5A:
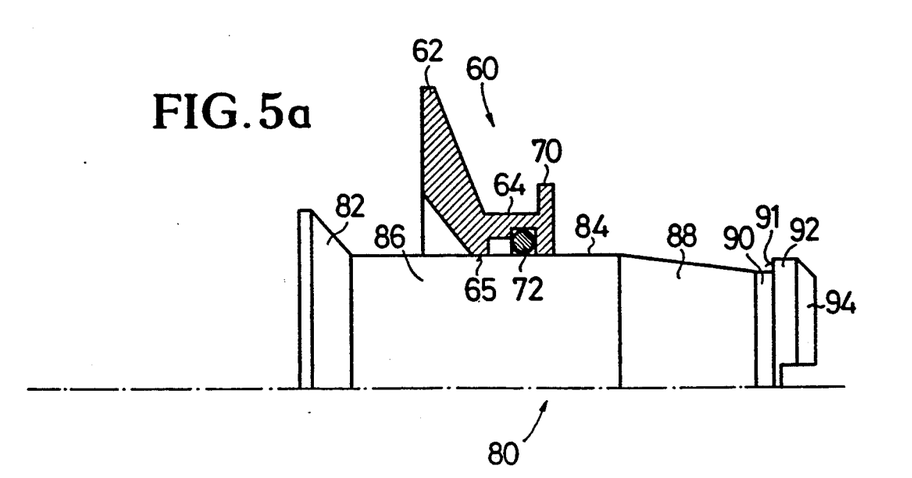
Figure 5B:
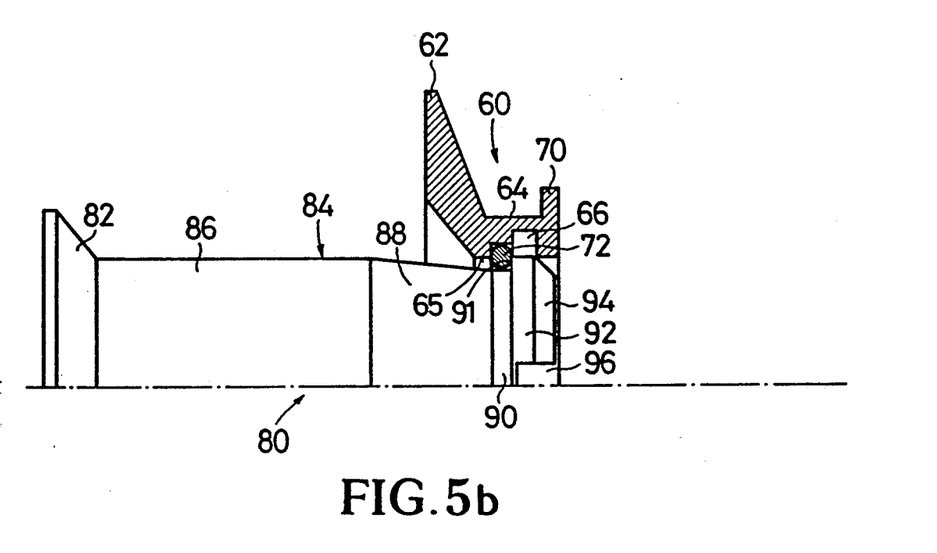

As can be seen more particularly from FIGS. 2 and 5a, a safety element 72, normally in the form of a circular clip or snap ring having a round cross section is disposed in the groove 66. If an attempt is made to extract the closure pin 80 from the hole 65 in the guide sleeve 60, as depicted in FIGS. 5a and 5b, the safety element 72 initially slides along the outer face of the cylindrical zone 86 of the shank section 84, until it encounters the gradually tapering tapered zone 88. The inwardly directed pre-stress in the safety element 72 causes it to contract gradually, remaining closely wrapped until it reaches the contact zone 90 where the diameter is a minimum and then encounters the stop face 91 of the rim stop 92. As a result of its contraction, the safety element 72 can enter the second groove 67 by axial displacement, but the sum of the depth of the second groove 67 and the radial extent of the stop face 91 is equal to or slightly greater than the thickness of the safety element 72, so that although it has a round cross-section the safety element 72 in the second groove 67 cannot yield outwardly. The furthest position the closure pin 80 can reach relative to the guide sleeve 60 is depicted in FIG. 5b. Beyond that position, the closure pin 80 is thus fixedly or permanently secured in the hole 65 in the guide sleeve 60, which in turn is fixed in the first component 2.

Figure 6A:
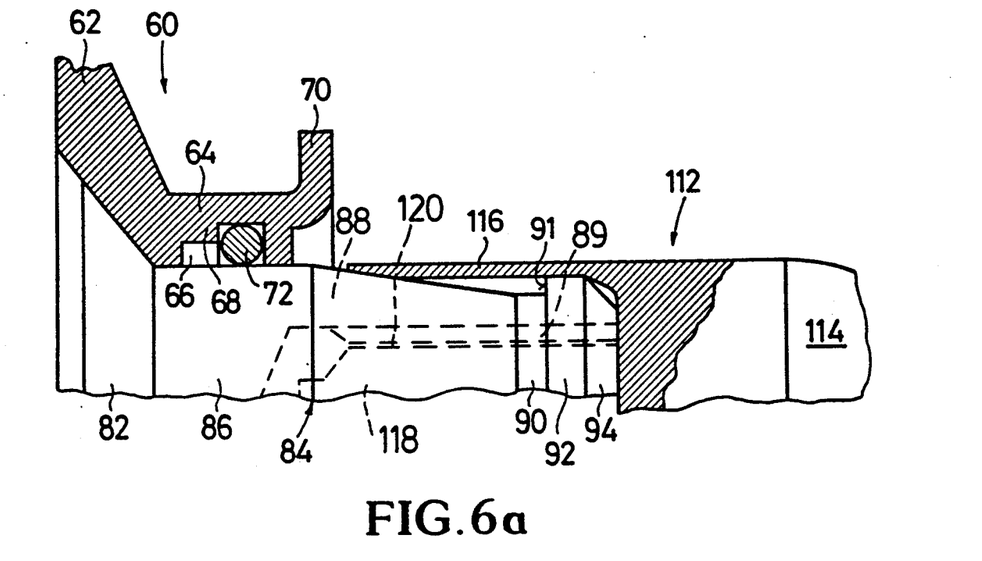
FIGS. 6a and 6b are schematic views showing on a larger scale than FIGS. 5a and 5b, how the closure pin can be completely withdrawn from the guide sleeve with the aid of a releasing tool of the invention.
Figure 6B:
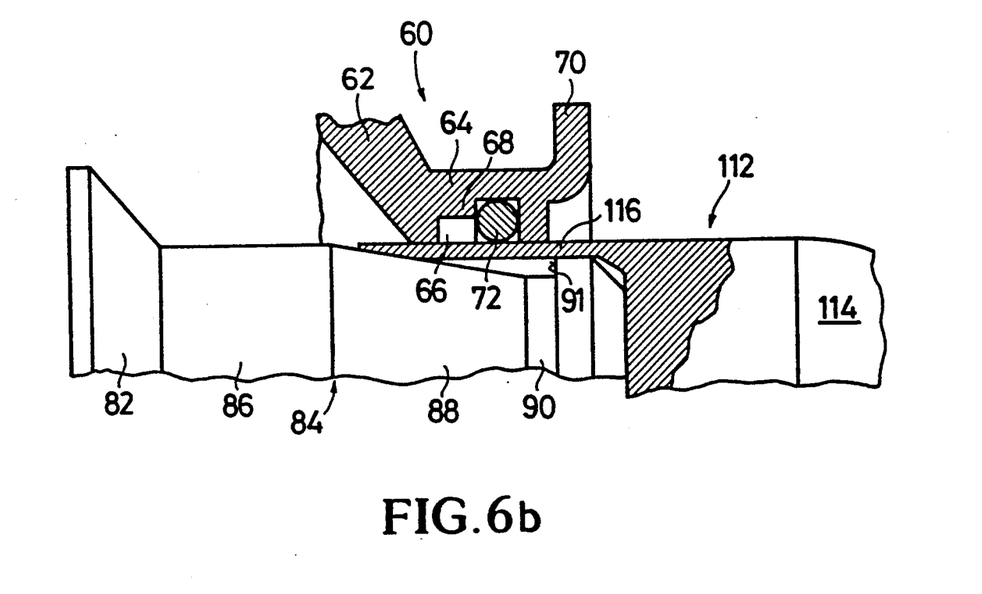
Figure 7:
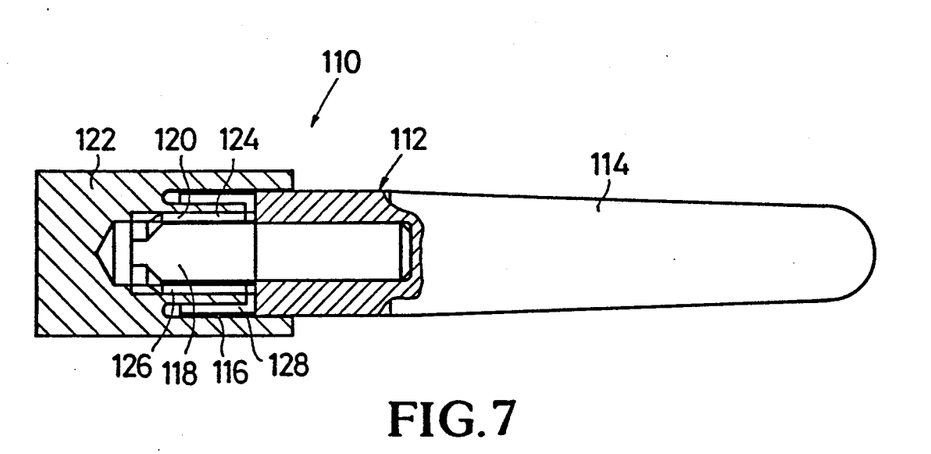
FIG. 7 is a side elevation, partly in section, of a releasing tool and a cap of the invention.

If it is required to extract the closure pin 80 completely from the first component 2 and hence out of the guide sleeve 60, one can use a releasing tool 110 as shown in FIGS. 6a, 6b and 7. A handle 114 of the releasing tool 110 carries a shank 112 of a hollow cylindrical tool section 116. As can be clearly seen from FIGS. 6a and 6b, the outer diameter of the cylindrical tool section 116 corresponds exactly to that of the cylindrical zone 86 of the shank section 84 of the closure pin 90. The inner diameter of the hollow cylindrical tool section 116 corresponds exactly, with a small clearance, to the outer diameter of the rim stop 92, so that, as shown in FIG. 6a, section 116 can be pushed onto the free shank end of the closure pin 80 until it completely overlaps the tapered and contact zones 88 and 90. To facilitate this, the wall thickness of the extreme tip region of the hollow cylindrical tool section 116 is reduced to a point, tapering complementary the tapered zone 88 of the shank section 84. As can be seen from FIG. 6b, the closure pin 80 can now be pushed completely out of the guide sleeve 60 without the safety element 72 engaging in the tapered and contact zones 88 and 90, safety element 72 continues instead to slide along the outer peripheral face of the cylindrical tool section 116 of the advancing releasing tool 110, so that on reaching a position exemplified in FIG. 6b the closure pin 80 can be withdrawn from the hole 65 in the guide sleeve 60, completely and without obstruction.

The extreme tip of the cylindrical tool section 116 can be seen to be relatively sharp. It therefore requires protection when the releasing tool 110 is not in use. FIG. 7 shows that for this purpose a cap 122 can be screwed onto the tip of the releasing tool 110 carrying the hollow cylindrical tool section 116. For this purpose, the working end of the handle 114 carries a guide screw 118 having an external thread 120, onto which the cap 122 can be screwed. A bore 124 in cap 122 is tapped with a required internal thread 126. An annular space 128 is provided between an inner cap section with the internal thread 126 and an outer cap section overlapping the handle end. Space 128 is wide enough to accommodate the hollow cylindrical tool section 116. Thus, the sharp knife-edge at the tip of the hollow cylindrical tool section 116 is sheathed inside the cap 122. The external thread 120 on the guide screw 118 matches the internal thread 89 in the closure pin 80, so that the releasing tool 110 can be screwed onto the closure pin 80 when the closure pin 80 has to be extracted. Thus, the releasing tool 110 forms a part of the overall inventive concept.

I claim:

1. A fastener apparatus for joining together first and second at least locally flat components having therethrough aligned holes, said apparatus comprising:

a closure pin insertable through the aligned holes in the components and lockingly securable to the first component, said pin having a head section to be supported at an outer side of the first component, a shank section to be inserted through the aligned holes and a threaded section, said shank section having an outer periphery including a tapered portion and a stop rim defining a stop face extending radially outwardly of said tapered portion, said stop rim having a maximum outer diameter less than a maximum outer diameter of said shank section other than said tapered portion;

a safety element to be mounted relative to the hole in the first component so as to be urged inwardly thereof, such that as said shank section of said pin is inserted in a direction through the hole in the first component said safety element is urged toward said outer periphery of said shank section, and such that when said stop rim is moved in said direction beyond said safety element, withdrawal of said pin from the first component in an opposite direction is prevented by abutment of said stop face with said safety element, thereby preventing complete extraction of said pin from the hole in the first component and securing said pin thereto;

a receptacle member positionable at an outer side of the second component and having a threaded fastening section engageable with said threaded section of said pin, thereby to join together the two components; and means for, upon disengagement of said receptacle member from said pin, selectively enabling said pin to be removed from the first component without damage to said pin, said means comprising a releasing tool having a hollow cylindrical section having an inner diameter equal to or larger than said outer diameter of said stop rim and an outer diameter equal to or less than said outer diameter of said shank section, such that said hollow cylindrical section may be fitted over said stop rim and said tapered portion to cover said tapered portion and urge said safety element away from said tapered portion to a position such that it may not be abutted by said stop face.

2. An apparatus as claimed in claim 1, further comprising a guide sleeve to be mounted within the hole in the first component, said guide sleeve having therethrough an opening through which extends said pin.

3. An apparatus as claimed in claim 2, wherein said guide sleeve has formed therein a groove opening into said opening, and said safety element is mounted within said groove.

4. An apparatus as claimed in claim 3, wherein a wall of said guide sleeve defining said groove closest to said head section has formed therein another groove opening into said opening and having an outer diameter less than an outer diameter of said groove, said safety element being positionable in said another groove.

5. An apparatus as claimed in claim 4, wherein a transition from said groove to said another groove defines a shoulder.

6. An apparatus as claimed in claim 4, wherein said groove and said another groove are circumferentially annular.

7. An apparatus as claimed in claim 6, wherein the sum of a smallest diameter of said tapered portion plus twice a thickness of said safety element is greater than an inner diameter of said opening and slightly smaller than or equal to an outer diameter of said another groove.

8. An apparatus as claimed in claim 2, wherein said guide sleeve has at an end thereof confronting said head section of said pin a radially widened head region and at an opposite end a radially widenable and deformable attachment section.

9. An apparatus as claimed in claim 1, wherein said tapered portion defines an annular groove in said outer periphery of said shank section of said pin.

10. An apparatus as claimed in claim 1, wherein said tapered portion expands axially toward said head section.

11. An apparatus as claimed in claim 1, wherein said outer periphery of said shank section includes a cylindrical zone extending axially from said head section, a tapered zone converging axially away from said cylindrical zone, and a smaller cylindrical zone extending axially from said tapered zone, said tapered zone and said smaller cylindrical zone constituting said tapered portion, and said stop face extends radially outwardly from said smaller cylindrical zone.

12. An apparatus as claimed in claim 1, wherein said safety element comprises a snap ring having a round cross section.

13. An apparatus as claimed in claim 1, wherein said threaded section of said pin comprises threads formed internally of said shank section.

14. An apparatus as claimed in claim 13, wherein said releasing tool includes an axially extending screw member positioned inwardly of said hollow cylindrical section and having threads engageable with said internal threads of said shank section.

15. An apparatus as claimed in claim 1, wherein said hollow cylindrical section of said releasing tool has an inner surface including a portion tapered complementary to said tapered portion of said outer periphery of said shank section of said pin.

* * * * *